(12) United States Patent
Luttrell

(10) Patent No.: US 8,140,769 B2
(45) Date of Patent: Mar. 20, 2012

(54) DATA PREFETCHER

(75) Inventor: Mark A. Luttrell, Cedar Park, TX (US)

(73) Assignee: Oracle America, Inc., Redwood City, CA (US)

( * ) Notice: Subject to any disclaimer, the term of this patent is extended or adjusted under 35 U.S.C. 154(b) by 439 days.

(21) Appl. No.: 12/426,801

(22) Filed: Apr. 20, 2009

(65) Prior Publication Data

US 2010/0268892 A1     Oct. 21, 2010

(51) Int. Cl.
*G06F 12/00*     (2006.01)
(52) U.S. Cl. ........ 711/137; 711/204; 711/213; 711/220; 711/221
(58) Field of Classification Search .......... 711/137, 711/204, 213, 220, 221
See application file for complete search history.

(56) References Cited

U.S. PATENT DOCUMENTS

| | | | |
|---|---|---|---|
| 6,128,703 A * | 10/2000 | Bourekas et al. | 711/138 |
| 6,571,318 B1 | 5/2003 | Sander et al. | |
| 6,701,414 B2 | 3/2004 | Abdallah et al. | |
| 7,350,029 B2 * | 3/2008 | Fluhr et al. | 711/137 |
| 2006/0179238 A1 * | 8/2006 | Griswell et al. | 711/137 |
| 2006/0248281 A1 * | 11/2006 | Al-Sukhni et al. | 711/137 |
| 2009/0198909 A1 * | 8/2009 | Speight et al. | 711/137 |

OTHER PUBLICATIONS

U.S. Appl. No. 12/426,808, filed Apr. 20, 2009 Entitled: "Data Prefetcher that Adjusts Prefetch Stream Length Based on Confidence" First named inventor: Mark A. Luttrell.

* cited by examiner

*Primary Examiner* — Pho M Luu
*Assistant Examiner* — Thao Bui
(74) *Attorney, Agent, or Firm* — Lawrence J. Merkel; Meyertons, Hood, Kivlin, Kowert & Goetzel, P.C.

(57) ABSTRACT

In an embodiment, a processor includes a data cache and a prefetch unit coupled to the data cache. The prefetch unit is configured to detect one or more prefetch streams corresponding to load operations that miss the data cache, and includes a memory configured to store data corresponding to potential prefetch streams. The prefetch unit is configured to confirm a prefetch stream in response to N or more demand accesses to addresses in the prefetch stream, where N is a positive integer greater than one and is dependent on a prefetch pattern being detected. The prefetch unit comprises a plurality of stream engines, each stream engine configured to generate prefetches for a different prefetch stream assigned to that stream engine. The prefetch unit is configured to assign the confirmed prefetch stream to one of the plurality of stream engines.

20 Claims, 8 Drawing Sheets

Fig. 2   To/from L2

| V | Tag | TID | Last Miss Address | Stride |

↘ 320

| Action | C Ptr | P Ptr | P Cnt | P Limit |
|---|---|---|---|---|
| Allocate, Address = 0x60, Stride = 0x20 | 60 | 60 | 0 | 4 |
| Prefetch Issued | 60 | 80 | 1 | 4 |
| Prefetch Issued | 60 | a0 | 2 | 4 |
| Prefetch Issued | 60 | c0 | 3 | 4 |
| Prefetch Issued | 60 | e0 | 4 | 4 |
| Stream Engine Hit (Address = 0x60) | 80 | e0 | 3 | 5 |
| Prefetch Issued | 80 | 100 | 4 | 5 |
| Stream Engine Hit (Address = 0x80) | a0 | 100 | 3 | 6 |
| Stream Engine Hit (Address = 0xa0) | c0 | 100 | 2 | 7 |
| Stream Engine Hit (Address = 0xc0) | e0 | 100 | 1 | 8 |
| Stream Engine Hit (Address = 0xe0) | 100 | 100 | 0 | 9 |
| Stream Engine Hit (Address = 0x100) | 120 | 120 | 0 | a |

DATA PREFETCHER

BACKGROUND

1. Field of the Invention

This invention is related to the field of processors and, more particularly, to data prefetching mechanisms in processors.

2. Description of the Related Art

Memory latencies are now a dominant factor in modern processor performance. As processor speeds have increased over the years, memory speeds have failed to keep pace. As a result, memory latencies have increased when measured in terms of numbers of processor clock cycles. Various strategies are being employed to mitigate the impact of these increased latencies. Some of these strategies include various forms of multi-threading (allowing other threads to continue while one thread waits for memory), larger caches, and various forms of speculation including run-ahead execution and result prediction.

Data prefetching can be used to alleviate performance lost to memory latency. Data prefetchers analyze a set of memory accesses, attempting to predict patterns within those accesses. When a pattern is recognized, prefetches can be issued to begin retrieving data from memory ahead of when the program requires it.

Prefetches can also interfere with the "real" accesses generated directly from instruction execution (often referred to as demand fetches or demand accesses). Accordingly, generating accurate prefetches (i.e. prefetches that have high likelihood of being the target of demand accesses that occur in later instruction execution) is important. A prefetcher that generates significant numbers of inaccurate prefetches can reduce performance.

SUMMARY

In one embodiment, a prefetch unit comprises a memory, a plurality of stream engines, and a control circuit coupled to the memory and the stream engines. The memory includes a plurality of entries, each entry configured to store data corresponding to a different potential prefetch stream. Each stream engine is configured to generate prefetches for a different prefetch stream assigned to that stream engine. In response to a first load operation that misses in a data cache in the processor, the control circuit is configured to: update a corresponding entry of the plurality of entries, detect a prefetch pattern corresponding to the first load operation responsive to data in the corresponding entry, and allocate a first prefetch stream corresponding to the detected prefetch pattern to one of the plurality of stream engines.

In an embodiment, a processor comprises a data cache and a prefetch unit coupled to the data cache. The prefetch unit is configured to detect one or more prefetch streams corresponding to load operations that miss the data cache, and comprises a memory configured to store data corresponding to potential prefetch streams. The prefetch unit is configured to confirm a prefetch stream in response to N or more demand accesses to addresses in the prefetch stream, where N is a positive integer greater than one and is dependent on the prefetch pattern being detected. The prefetch unit comprises a plurality of stream engines, each stream engine configured to generate prefetches for a different prefetch stream assigned to that stream engine. The prefetch unit is configured to assign the confirmed prefetch stream to one of the plurality of stream engines.

BRIEF DESCRIPTION OF THE DRAWINGS

The following detailed description makes reference to the accompanying drawings, which are now briefly described.

Figure 1:
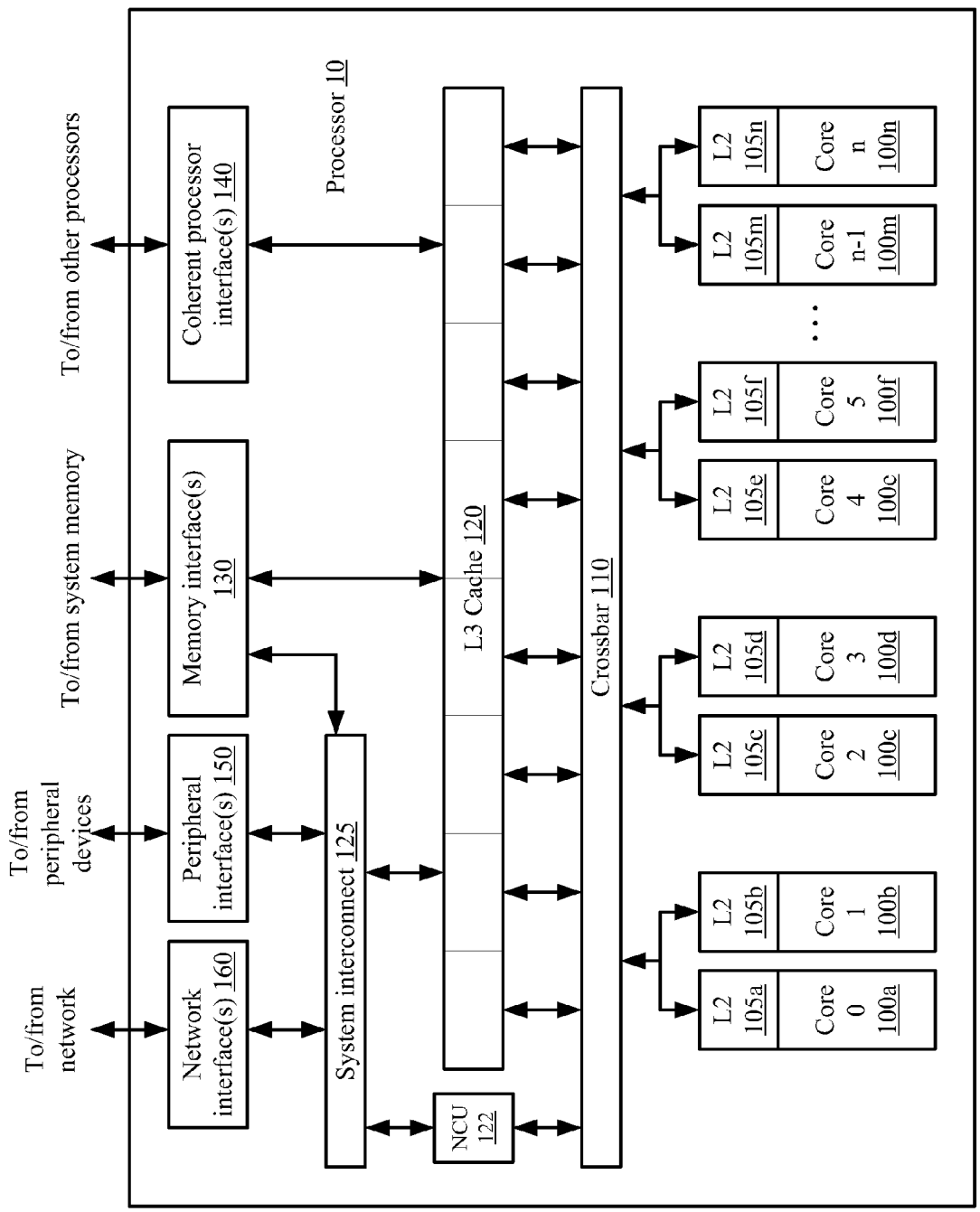
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

In one embodiment, a prefetch unit includes a memory, referred to as the prefetch learning table (PLT) herein, a control circuit for the PLT, and multiple stream engines. The PLT may store data to learn about prefetch streams. Once a prefetch stream has been detected and confirmed in the PLT, the control circuit may assign the prefetch stream to a stream engine that may be configured to generate prefetches. Thus, the learning (or detection) of prefetch streams may be decoupled from the generation of prefetches in the confirmed prefetch streams. In one embodiment, since the data in the PLT is not used to generate prefetches, a relatively simple memory may be implemented. For example, a static random access memory (SRAM) with a relatively small number of ports, such as a dual ported SRAM may be used. The ports are used to read an entry in response to a cache miss and to write an entry with updated data to track a potential prefetch stream. A simpler memory is less expensive to implement (e.g. in terms of integrated circuit area), and thus more entries may be supported than might otherwise be possible with a more complex memory. More accurate prefetch stream identification may result, in some embodiments. Additionally, when a new potential prefetch stream is identified and the control circuit overwrites an entry in the PLT, the data that is overwritten in the entry is for another potential (unconfirmed) prefetch stream. Active prefetch streams are in the stream engines, and may not be affected by the overwriting of entries in the PLT.

The stream engines may also be relatively simple, since the stream engines may not include the circuitry to learn a prefetch stream. Instead, the stream engines are issued a confirmed stream and are configured to generate prefetches and to control the number of prefetches that are outstanding (e.g. issued and, at some later point, written to the data cache but not yet consumed by a demand access). In one embodiment, for example, the stream engine may monitor the number of demand accesses that are consumed within the prefetch stream. Once the number of consumed prefetches equals the current limit for prefetches outstanding (thus indicating that the prefetch stream is accurately prefetching data that is later used, increasing a level of confidence in the prefetch stream), the stream engine may be configured to increase the limit. In one embodiment, the limit may be doubled each time it is increased.

The memory in which the PLT is stored includes multiple entries, each entry capable of tracking a different potential prefetch stream. Any mechanism may be used by the control circuit to select an entry. In one embodiment, for example, the memory may receive the program counter (PC) address from which an instruction was fetched, where the instruction corresponds to a memory operation that is detected to miss in the data cache. The PC is sometimes referred to as the instruction pointer (IP). The remainder of this instruction may refer to the PC, and the IP may be synonymous. Generally, the PC or IP may refer to the address from which an instruction is fetched. The address of the memory location accessed during execution of a load/store may be referred to as a data address (or simply an address).

At least a portion of the PC may be used as an index into the memory, to select an entry or entries to track the potential prefetch stream. Thus, prefetch streams may be associated with instructions in this embodiment. In other embodiments, the address to the memory may be derived from the PC (e.g. a hash of the PC or a portion thereof). In embodiments that include hardware support for simultaneous multithreading, the thread identifier (ID) of the thread containing the instruction may also be used, to prevent or reduce aliasing between different threads. For example, multiple copies of the same application may be executing on a multi-threaded processor, and thus may have the same virtual PC even though the threads differ. In one embodiment, the thread ID may be matched to a thread ID field in the selected entry or entries, so that only an instruction from a given thread may update the data tracking the potential prefetch stream. In one embodiment, the thread ID may also be included in the index generation (e.g. it may be hashed with the PC), so that the same PC from different threads may select different entries. Such an embodiment may permit more accurate prefetch stream identification when multiple application copies are being executed, or PCs are otherwise aliased among multiple threads. Accordingly, the address used to index the PLT memory may generally be used to locate an entry or entries in the memory (and may be compared to a tag in the entries, in some embodiments). The address to the PLT memory may not necessarily be an address that can be used to access as system memory in a system with the processor.

Generally, a memory operation may be a load (memory read) or store (memory write). The operation may be an explicit load/store instruction, or may be an implicit part of an instruction that has a memory operand, in some instruction sets. A load memory operation may be more succinctly referred to herein as a load operation, and a store memory operation may be more succinctly referred to as a store operation. In one embodiment, only load operations that miss the data cache may cause access to the PLT. In one implementation, software prefetch instructions may not be treated as load operations for prefetch purposes, although other implementations may include them.

A prefetch may generally be a memory read operation that is generated by hardware (e.g. the prefetch unit) in response to identifying a prefetch pattern among the miss addresses from a data cache. On the other hand, a demand access is a memory operation (read or write) that is directly derived from an instruction being executed (either an explicit load/store instruction or an instruction having a memory operand, as discussed above). Various prefetch algorithms may be used. For example, a strided prefetch algorithm detects a pattern of addresses that are separated by a fixed amount, referred to as the stride. That is, the difference between consecutive addresses in the pattern is the stride. Prefetches may be generated by adding the stride to the most recent address and prefetching from the resulting address, adding the stride to the resulting address to generate the next prefetch, etc. Other prefetch algorithms are possible in other embodiments. In general, the prefetch pattern permits the addresses that may be demand accesses at some later point to be predicted, and the prefetches that are predicted may be issued and the corresponding data written to the data cache. The subsequent demand access may be a cache hit, and thus may be lower latency than if prefetching had not been performed. A prefetch stream may be a collection of prefetches that correspond to a detected prefetch pattern. That is, the prefetch stream may be the predicted set of future demand accesses based on the prefetch pattern.

If a prefetch is correct, a subsequent demand access occurs that accesses the prefetched data. The demand access accessing the prefetched data is referred to as the demand access "consuming" the prefetched data.

The present description refers to accesses that hit/miss the cache. Generally, an access to data that is found in the cache at the time of the access is a hit, and an access to data that is not found in the cache at the time of the access is a miss. The description may also refer to an address hitting/missing in other circuitry such as a miss buffer or a stream engine. In such cases, the address may be a hit if it is in the same cache block as an address in the buffer or stream engine, and may be a miss otherwise. The cache block is the unit of allocation and deallocation in the cache.

The prefetch unit as described herein may be implemented in many types of processors. An overview of one embodiment of a multi-core, multi-threaded processor is provided below with regard to FIGS. 1 and 2. However, other embodiments may be used in single core processors (multi-threaded or single-threaded), and may be used in multi-core, single-threaded processors as well.

Overview of Multithreaded Processor Architecture

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In one embodiment, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in one embodiment, each core 100 may have a dedicated corresponding L2 cache 105. In one embodiment, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In one embodiment, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In one embodiment, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In one embodiment, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in one embodiment, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in one embodiment each of cores 100 may be configured for multithreaded, out-of-order execution. More specifically, in one embodiment, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound-completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In one embodiment, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In one embodiment, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
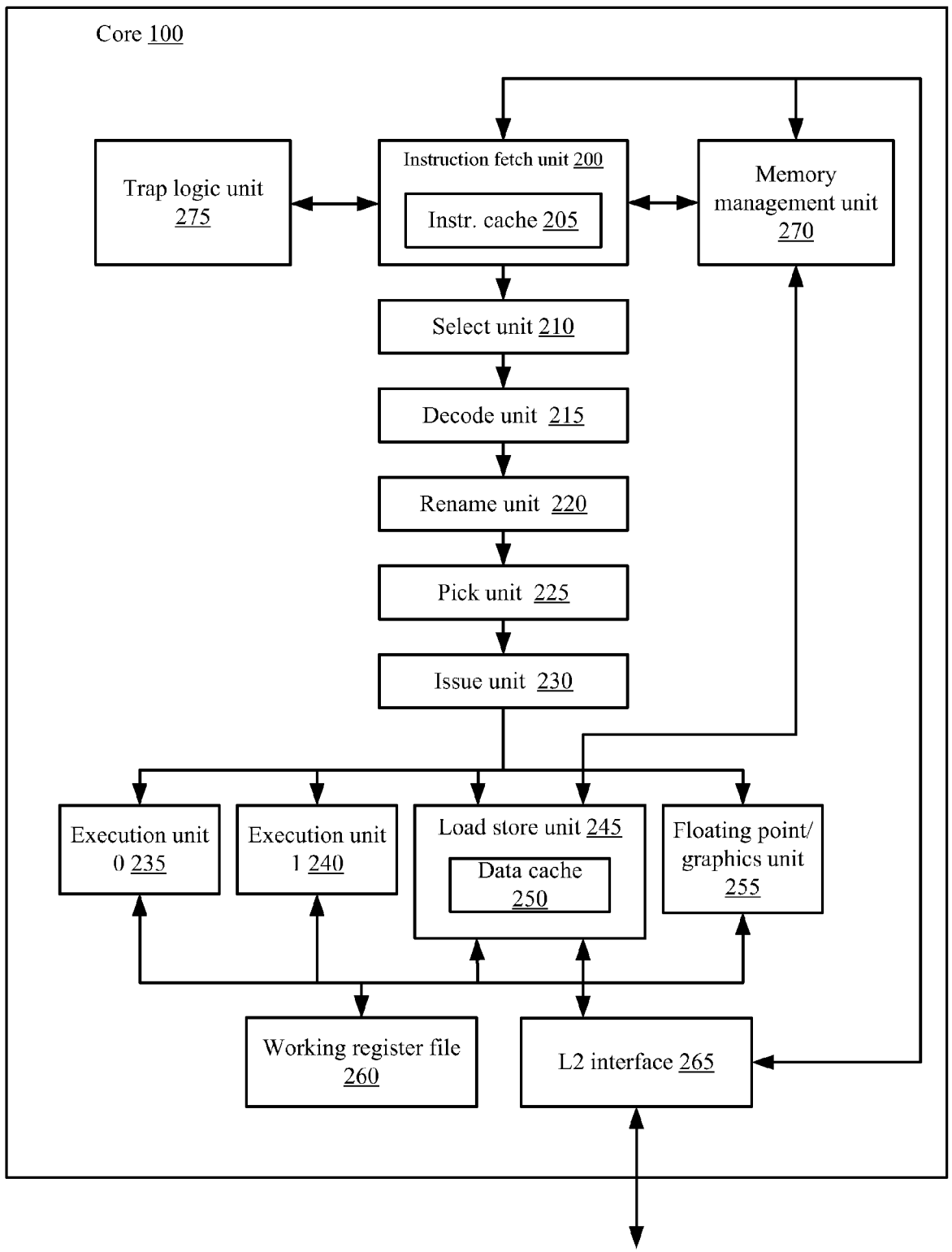
FIG. 2 is a block diagram of one embodiment of a core shown in FIG. 1.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In one embodiment, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In one embodiment, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In one embodiment, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In one embodiment, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In one embodiment, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In one embodiment, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In one embodiment, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In one embodiment, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In one embodiment, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in one embodiment floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In one embodiment, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In one embodiment, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In one embodiment, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In one embodiment, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In one embodiment, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Prefetch Unit

Figures 3, 4:
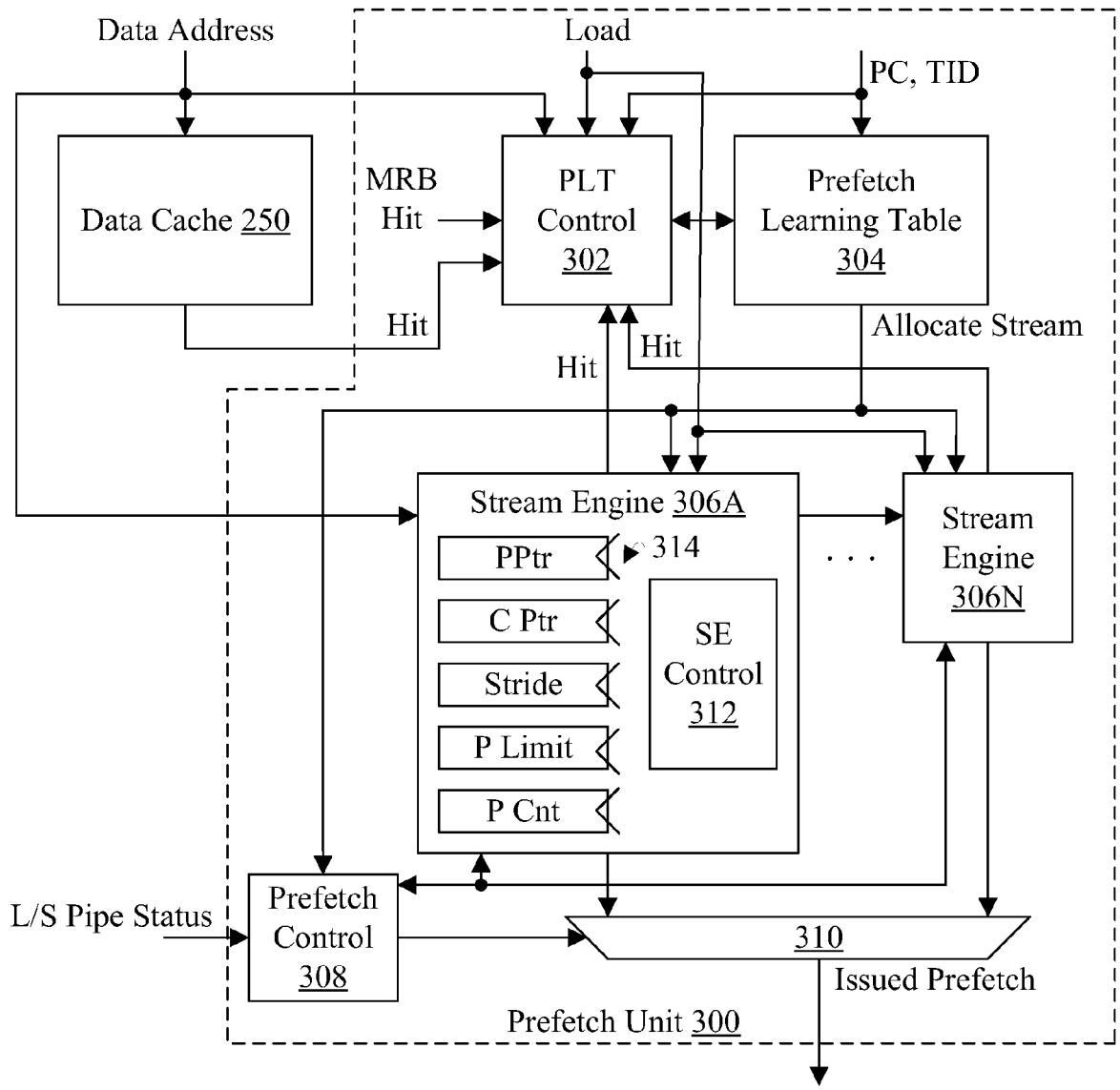
FIG. 3 is a block diagram of one embodiment of a data cache and a portion of a load/store unit shown in FIG. 2.
FIG. 4 is a block diagram of one embodiment of an entry for one a prefetch learning table (PLT) shown in FIG. 3.

Turning now to FIG. 3, a block diagram illustrating one embodiment of the data cache 250 and a prefetch unit 300

(which may be part of the LSU 245, in one embodiment) is shown. The data cache 250 and the prefetch unit 300 (and more particularly the stream engines 306A-306N and the PLT control circuit 302) are coupled to receive a data address corresponding to a memory operation, and the data cache 250 is configured to transmit a hit signal to the prefetch unit 300 (and more particularly to the PLT control circuit 302 in the prefetch unit 300). The prefetch unit 300 (and more particularly the prefetch learning table memory 304 and the PLT control circuit 302) is coupled to receive a PC and a thread ID (TID). The prefetch unit 300 includes the PLT control circuit 302, the PLT memory 304, the plurality of stream engines 306A-306N, a prefetch control circuit 308, and a multiplexor (mux) 310. The PLT control circuit 302 is coupled to the PLT memory 304 and to receive additional hit signals from a miss request buffer (MRB) and the stream engines 306A-306N. The PLT memory 304 is coupled to the stream engines 306A-306N and to the prefetch control circuit 308, which is coupled to receive pipe status for the load/store pipe (L/S pipe status in FIG. 3). The prefetch control unit is coupled to the stream engines 306A-306N and to provide selection control for the mux 310. The inputs to the mux 310 are the prefetch outputs from the stream engines 306A-306N, and the output of the mux 310 is an issued prefetch. The stream engine 306A is shown in more detail in FIG. 3 to include an SE control circuit 312 and a set of registers 314.

As mentioned previously, the prefetch unit 300 may be configured to monitor the cache misses from the data cache 250 to identify prefetch streams. Accordingly, the data address that is supplied to the data cache 250 may be provided to the prefetch unit 300, along with the hit signal from the data cache 250. If the data address is a miss in the data cache 250, the address may be a candidate from which to attempt to detect a prefetch stream. In one embodiment, the data address may be qualified by whether or not the data address is for a load operation (load signal to the PLT control circuit 302 and the stream engines 306A-306N in FIG. 3). The load signal may be asserted for a load operation, and may be deasserted for a store operation, a software prefetch operation, and a prefetch issued by the prefetch unit 300 that is being filtered through the data cache 250.

In the illustrated embodiment, a data address of a load operation that is a cache miss is also compared to the miss request buffer in the processor core (not shown in FIG. 3). The miss request buffer stores one or more addresses of cache misses (as well as other operations such as non-cacheable operations) that are to be transmitted to the next lower level in the memory hierarchy or elsewhere outside the core 100. The cache misses may result in cache fills to retrieve the missing cache blocks and write the missing blocks to the data cache 250. Accordingly, if another cache miss to the same cache block is detected, the prefetch unit 300 has learned of that cache miss and need not monitor the address for prefetch purposes. Additionally, the data address is compared to the addresses in the stream engines 306A-306N. If the data address is included in an already-allocated prefetch stream, then it may not need to be monitored for additional is prefetch purposes.

The PC and TID of the load operation are provided to the PLT memory 304 to select one or more entries. The PLT memory 304 may have any configuration, including configurations similar to a cache. For example, the PLT memory 304 may have a direct mapped configuration in which one entry is selected for a given input address; the PLT memory 304 may have a set associative configuration in which a set of two or more entries is selected for the given input address; or the PLT memory 304 may have a fully associative configuration in which the input address is compared to a corresponding field in each entry to detect a hit. Generally, at least a portion of the input address (the index) may be used to select one or more entries. A remaining portion of the input address may be compared to a tag value in the entry or entries to detect a hit, if less than the full input address is used as the index. The data address that may be written to an entry may be generated separately, and is not used to index the PLT memory 304 in this embodiment. That is, the input address is not the data address in this embodiment.

As mentioned previously, the PC (and optionally the TID) may be hashed to generate the input address to the PLT memory 304. For example, selected bits of the PC and the TID may be exclusive ORed to produce respective bits of the hash value.

The PLT memory 304 may be configured to output the data from the selected entry/entries to the PLT control circuit 302 for processing and possible update. If the data address is a data cache miss (and misses the stream engines 306A-306N and the MRB), the PLT control circuit 302 may be configured to generate an update for the PLT memory 304. If the tag match in the PLT memory 304 is a hit, the cache miss is another miss for (possibly) the same load operation, and the data may be updated to further attempt to discover and/or confirm a prefetch pattern. In cases in which a hashed value of the PC (and optionally TID) is used as the address input, there may be some aliasing but the prefetch unit 300 may be configured to operate as if the same load is hitting in the entry each time. If the tag match in the PLT memory 304 is a miss, the PLT control circuit 302 may be configured to overwrite the entry with new data related to the current miss. If more than one entry is selected (e.g. in a set associative embodiment), any replacement scheme may be used to select one of the entries for replacement.

The update may confirm the prefetch stream. A confirmed prefetch stream may be a prefetch stream for which demand accesses have been detected often enough to indicate that the pattern has been detected. For example, in one embodiment, at least 3 demand accesses in the stream may be detected. The first access initializes the entry, the second access permits the stride to be calculated, and the third access permits the stride to be compared to determine that it matches the previously computed stride.

If the update confirms a prefetch stream, the prefetch stream may be allocated to one of the stream engines 306A-306N. In one embodiment, the prefetch control circuit 308 may be configured to select which of the stream engines 306A-306N is allocated. In another embodiment, the PLT control circuit 302 may be configured to select the stream engine 306A-306N. Any mechanisms for selecting a stream engine may be used. For example, one or more of the stream engines 306A-306N may be idle (e.g. because the outstanding prefetches have reached the limit). The prefetch stream may be allocated to one of the idle stream engines. The idle stream engine may be randomly selected, or data indicating which stream engine has been idle for the longest period of time may be captured, so that the longest-idle stream engine may be selected. Alternatively, data may track which stream engines have most recently issue prefetches (e.g. using a least recently used scheme or a pseudo-least recently used scheme). In one embodiment, a used bit (U bit) scheme may be used in which each stream engine is marked as used when it issues a prefetch, and a stream engine that is not marked as used may be selected. When all the stream engines are marked as used, all stream engines marked as unused and the process of marking them used begins again.

In response to an allocated prefetch stream, the PLT control circuit 302 may be configured to invalidate the corresponding entry in the PLT memory 304. Since the prefetch stream has been confirmed and allocated to a stream engine, additional learning by the PLT may be counterproductive (e.g. the prefetch stream may be confirmed again and allocated to another stream engine). As an alternative to invalidating, the entry may record an indication that the stream has been confirmed and allocated to a stream engine.

The stream engine 306A-306N which is allocated the prefetch stream may be configured to begin issuing prefetches. Generally, a stream engine may comprise any circuitry that may be provided with data identifying a confirmed prefetch scheme that may be configured to issue the prefetches (up to a limit with respect to the most recently consumed prefetch) and that may be configured to monitor consumption of the prefetches and to control the number of outstanding prefetches. In one embodiment, the stream engines 306A-306N may be similar to the stream engine 306A shown in FIG. 3 in more detail.

At a given point, one or more of the stream engines 306A-306N may be configured to determine that a prefetch is ready to be issued. The stream engines 306A-306N with ready prefetches may be configured to signal the prefetch control unit 308, and may be configured to provide the prefetches to the inputs of the mux 310. The prefetch control unit 308 may be configured to select one of the ready prefetches, and may be configured to control the mux 310 to select the prefetch as an issued prefetch. The prefetch control unit 308 may also signal the stream engine 306A-306N when a prefetch from that engine has been issued, so that the stream engine may update to the next prefetch.

In one embodiment, the issued prefetches may be inserted into the L/S pipe at a point prior to the access to the data cache 250. The prefetches may thus be filtered through the data cache 250, appearing as the data address input (with the load signal to the prefetch unit 300 deasserted). If a prefetch hits in the data cache 250, it need not propagate to lower levels of the memory hierarchy (e.g. the L2 cache 105a-105n, the L3 cache 120, etc.). In other embodiments, the issued prefetches may not be passed through the data cache 250.

For embodiments that filter the prefetches through the data cache 250, the prefetch control unit 308 may be configured to monitor the L/S pipe status, searching for idle cycles in the pipe into which prefetches may be inserted. Since demand accesses are less speculative than prefetches, a demand access may generally be permitted to proceed and the prefetches may be stalled. In other embodiments, additional factors may be included in the L/S pipe status. For example, if the MRB is becoming full (or has reached a high watermark for prefetches), then additional prefetches may be stalled until previous activity has been handled. If the MRB is becoming full with demand accesses, inhibiting prefetch may be better for overall performance than attempting prefetch. Additionally, having a high watermark for prefetches may prevent prefetches from occupying too much bandwidth, to keep the prefetches from interfering with demand accesses.

As shown in the stream engine 306A, the registers 314 may store a pair of pointers (P Ptr and C Ptr), a stride, and limit data that indicates a current limit to the number of outstanding prefetches (P Limit and P Cnt). The prefetch pointer (P Ptr) may be the next address that is to be prefetched in the prefetch stream assigned to the stream engine 306A. The consumption pointer (C Ptr) is the next address in the prefetch stream that is expected to be consumed by a demand access. The stride is the stride amount detected for the prefetch stream, and may be a positive or negative value, in some embodiments. Initially, when a prefetch stream is allocated to the stream engine 306A, both the P Ptr and the C Ptr may be set to the miss address that confirmed the prefetch stream plus the stride, and the stride is set to the confirmed stride for the prefetch stream. The P Cnt may be initialized to zero, and the P Limit may be initialized to an initial limit for the outstanding prefetches.

The P Cnt may be a counter that tracks a number of outstanding prefetches in the prefetch stream. The P Limit may be the limit to the number of outstanding prefetches, but the limit may also be increased as the number of prefetches that are consumed by demand accesses (thus indicating that the prefetches are correct) increases. Additional details regarding one embodiment of the update of the limit data is provided below with regard to FIGS. 7, 8, and 9.

The SE control circuit 312 is coupled to the registers 314, and is configured to generate prefetches and to update the registers 314 as the prefetches are issued. Additional details for one embodiment are discussed below.

It is noted that, while registers 314 are described as separate registers above, data may be combined and stored into a single register or fewer registers than shown in FIG. 3. Generally, the registers 314 may be implemented by any clocked storage devices (latches, flops, etc.).

The stride that is calculated for the prefetch stream may be determined at any granularity. For example, the stride may be calculated at the cache block granularity. In such cases, the stride may be concatenated with least significant zeros to cover the cache offset portion of the address. For example, a 64 byte cache block would result in concatenating the stride with 6 zeros.

Other embodiments may determine the stride at a finer granularity than the cache block. Any granularity may be used, down to the byte level of granularity, in various embodiments. Finer granularity strides may permit stride detection for prefetch streams that are not an even multiple of a cache block size, and may permit earlier detection of prefetch streams with small strides.

For example, if a stride at the granularity of a cache block is used, but the actual stride of the prefetch stream is a not an even multiple of the cache block size, the stride would appear to change periodically during the prefetch stream. Consider, for example, an actual stride of 0x28 (that is, hexadecimal 28) and a cache block size of 32 bytes (0x20). If the initial address in the prefetch stream is zero, the first three demand accesses would 0x0, 0x28, and 0x50. At a cache block granularity, the stride would be calculated as 0x20 (or one cache block). However, the next address in the stream is 0x78 (which is two cache blocks from the cache block that includes 0x50). Accordingly, the prefetch stream would prefetch the intervening cache block, which would not be consumed. The prefetch stream would become idle when the limit is reached, and thus the prefetch would not be as useful as it otherwise could be. Additionally, for small strides, multiple accesses within the same cache block may occur. By using a finer granularity stride, the stream may be detected more quickly since the stride is more accurately calculated.

The data address may be a virtual address, or may be a physical address to which the virtual address translates (e.g. through a translation lookaside buffer (TLB) or other translation caching structure). If the data address is virtual, the prefetch unit 300 may insert prefetches into the L/S pipe at a point prior to initiating translation of the data address. The translation may be provided prior to data cache access (in which case the physical address may be received as illustrated in FIG. 3), or may be performed in parallel with or after the data cache access. If physical addresses are stored in the prefetch unit 300, the translated portion of the physical address may be received from the TLBs, for example.

It is noted that the description of FIG. 3 above relates to one data cache port. There may be multiple data cache ports to support concurrent access. A similar discussion to that above may apply to each port. The PLT memory 304 may include additional ports, for example, to support concurrent prefetch stream learning from each port.

Turning next to FIG. 4, a block diagram of an exemplary entry 320 that may be used in one embodiment of the PLT memory 304 is shown. The PLT memory 304 may include multiple entries similar to entry 320, in any arrangement (direct mapped, set associative, fully associative, etc.).

The entry 320 includes various data fields. The fields included in a given embodiment depend on the type of prefetch pattern that the prefetch unit 300 is designed to support. For example, the entry 320 in FIG. 4 may support the detection of strided prefetch patterns. In FIG. 4, the entry 320 includes a valid bit (V), a tag field (Tag), and thread ID field (TID), a last miss address field (LMA) and a stride field (Stride).

The valid bit may indicate whether or not the entry is storing valid data. The PLT control circuit 302 may be configured to set the valid bit when writing the entry with data for a new potential prefetch stream to be detected. Additionally, in some embodiments, the PLT control circuit 302 may be configured to reset the valid bit in response to allocating the confirmed prefetch stream to one of the stream engines 306A-306N. Other embodiments may reverse the meanings of the set and clear states of the valid bit, or use any other encoding.

The tag field may store the bits of the input address to the PLT memory 304 that are not used to select an entry or entries in the memory, if any. Thus, the tag field may be optional in some embodiments, e.g., in which all of the input address bits are used to select an entry. The TID field may store the thread ID for multi-threaded embodiments (and thus may not be included in single-threaded embodiments). In single-threaded embodiments, a process identifier (PID) or a representation thereof (such as a hash of the PID) may be stored in the entry 320.

The last miss address field may store the most recently detected miss address for the potential prefetch stream recorded by the entry 320. The stride field may store the stride that is currently predicted to be the stride for the prefetch pattern that controls the predicted prefetches forming the prefetch stream.

Figure 5:
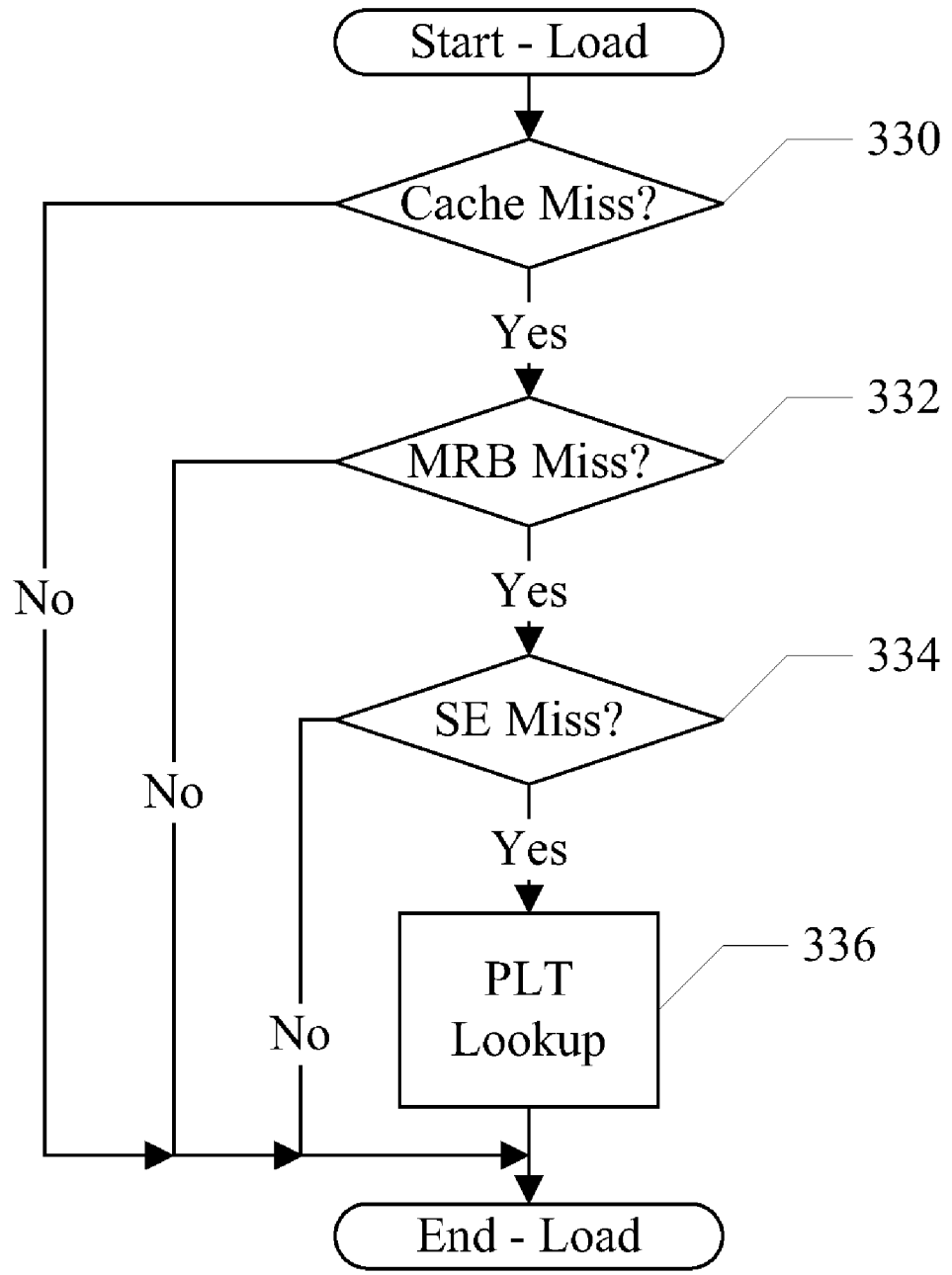
FIG. 5 is a flowchart illustrating operation of one embodiment of a PLT control circuit shown in FIG. 3.

Turning now to FIG. 5, a flowchart is shown illustrating operation of one embodiment of the PLT control circuit 302 in response to a load operation accessing the data cache 250. While the blocks are shown in a particular order for ease of understanding, other orders may be used. Blocks may be performed in parallel in combinatorial logic circuitry within the PLT control circuit 302. Blocks, combinations of blocks, and/or the flowchart as a whole may be pipelined over multiple clock cycles. Thus, the PLT control circuit 302 may be configured to implement the operation illustrated in FIG. 5.

The PLT control circuit 302 may receive the hit signal from the data cache 250 for the data address, along with the hit signal from the MRB and the hit signals from the stream engines. The hit signals may all be received in the same clock cycle, or may be received in different clock cycles as the load operation progresses through the L/S pipe in the processor. If the load operation is a cache miss (hit signal from the data cache 250 deasserted—decision block 330, "yes" leg), a miss in the MRB (MRB hit signal deasserted—decision block 332, "yes" leg), and a miss in the prefetch streams in the stream engines (hit signals from the stream engines deasserted—decision block 334, "yes" leg), the PLT control circuit 302 may enable a lookup in the PLT memory 304 (block 336). A PLT memory 306 update may also occur. Further details of the lookup and possible update are provided below with regard to FIG. 6.

The hit determination for the data cache 250 and the MRB may be at a cache block granularity against the cache blocks stored in the cache and the miss requests stored in the MRB, respectively. For the stream engines 306A-306N, the comparison may be to the C Ptr in each stream engine, to indicate consumption of another prefetch in the prefetch stream. The granularity of the comparison may be the cache block. Alternatively, in other embodiments, the granularity of the comparison may be the same as the granularity of the stride detection (e.g. in embodiments in which the granularity of the stride detection is finer than the cache block, as discussed above).

Figure 6:
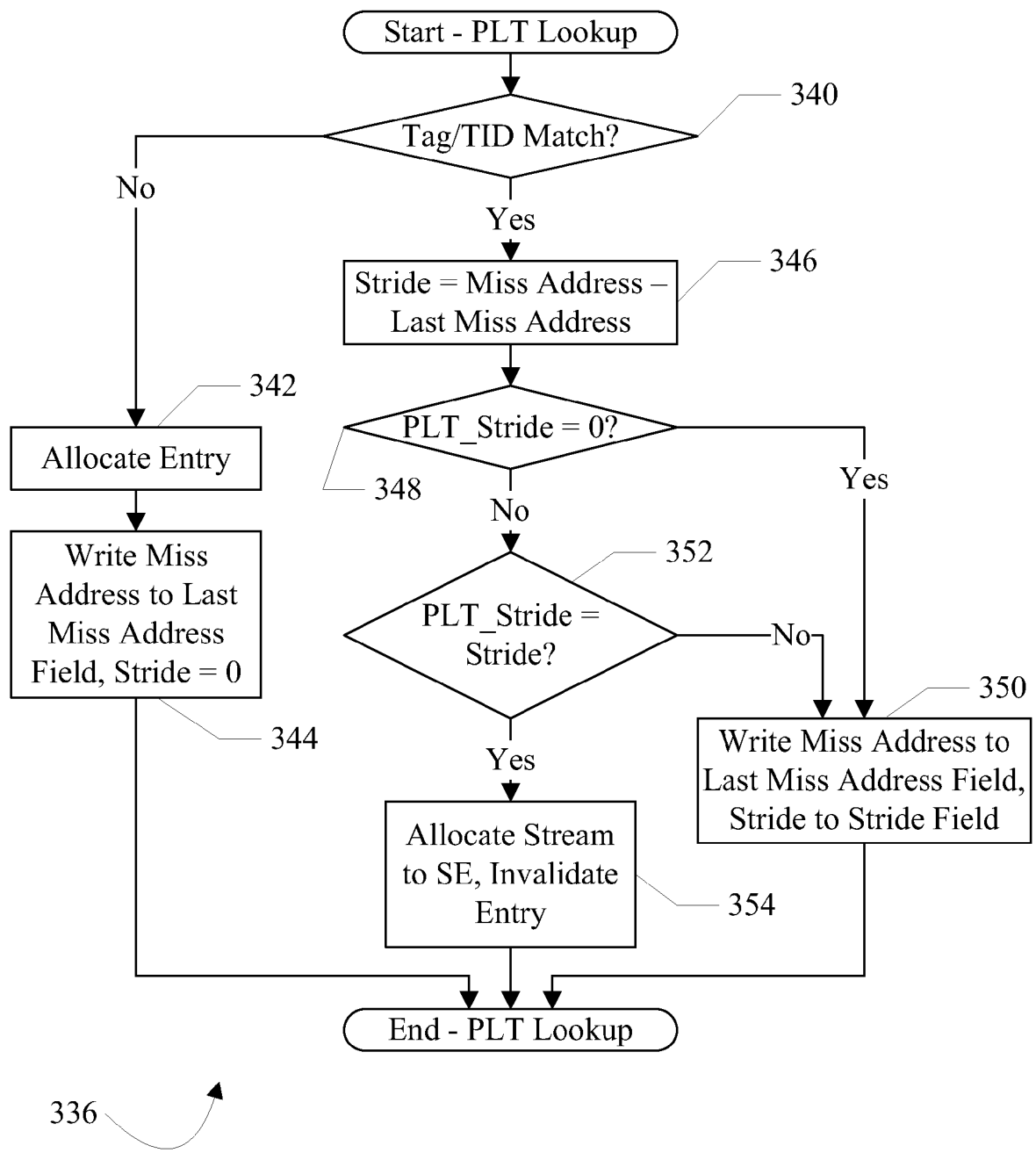
FIG. 6 is a flowchart illustrating operation of one embodiment of a PLT lookup illustrated in FIG. 5.

Turning now to FIG. 6, a flowchart is shown illustrating operation of one embodiment of the PLT control circuit 302 to perform a PLT memory 306 lookup (e.g. block 336 from FIG. 5). While the blocks are shown in a particular order for ease of understanding, other orders may be used. Blocks may be performed in parallel in combinatorial logic circuitry within the PLT control circuit 302. Blocks, combinations of blocks, and/or the flowchart as a whole may be pipelined over multiple clock cycles. Thus, the PLT control circuit 302 may be configured to implement the operation illustrated in FIG. 6.

In embodiments that implement a tag for a portion of the input address to the PLT memory 304, the PLT control circuit 302 may compare the tag from the tag field of the selected entry (or entries) to the tag portion of the input address. Similarly, in embodiments that implement the TID field, the PLT control circuit 302 may compare the TID from the TID field of the selected entry (or entries) to the input TID. Alternatively, one or both fields of the entry may be CAM entries and the comparison may be made in the memory 304. If the tag and/or TID do not match (decision block 340, "no" leg), the potential prefetch stream is a miss in the PLT memory 304. The PLT control circuit 302 may allocate an entry to the potential prefetch stream (block 342) and may write the miss address to the last miss address field of the entry (block 344). The PLT control circuit 302 may also set the stride field to zero in the allocated entry, write the new tag and TID to the respective entry fields, and set the V bit in the entry.

In embodiments in which more than one entry is selected in response to an input address, the comparison of the tag and TID in each selected entry may be performed in parallel. If the tag and TID match in any one of the selected entries, the result of the decision block 340 may be yes. Additionally, the PLT control circuit 302 may select among the entries to allocate an entry using any desired algorithm. For example, the PLT control circuit 302 may attempt to select an invalid entry (V bit clear). If all entries are valid, a random selection may be made, an LRU or pseudo-LRU algorithm may be used to select an entry, a U bit algorithm may be used to select an entry, etc.

If the tag and TID match in an entry (decision block 340, "yes" leg), the PLT control circuit 302 may receive the contents of the matching entry as a read output from the PLT memory 304. The PLT circuit 302 may compute the stride as the difference between the current miss address and the last miss address in the miss address field (block 346). If the stride field in the matching PLT entry is zero (decision block 348, "yes" leg), then the potential prefetch stream has not yet been confirmed. The PLT control circuit 302 may update the entry, writing the miss address to the last miss address field of the entry and the computed stride to the stride field of the entry (block 350). If the stride field in the matching PLT entry is non-zero (decision block 348, "no" leg), then a previous potential stride has been recorded for the potential prefetch stream. If the currently calculated stride matches the stride field (decision block 352, "yes" leg), the prefetch stream may be confirmed. The PLT control circuit 302 may allocate the confirmed prefetch stream to a stream ending 306A-306N and may invalidate the entry in the PLT memory 304 (block 354). If the currently calculated stride does not match the stride field (decision block 352, "yes" leg), the potential prefetch stream may not yet be confirmed. The PLT control circuit 302 may update the entry with the miss address as the last miss address and the currently calculated stride as the stride (block 350).

The above embodiment confirms a prefetch stream after three loads have been detected in the stream. Other embodiments may implement schemes in which more than three loads are used to confirm a prefetch stream. For example, a match count field may be added to the PLT entries, and the stride in the entry may be matched multiple times to confirm a prefetch stream (e.g. counting the matches in the match count field, and comparing the match count to a desired count).

It is noted that, in pipelined embodiments, it is possible that the next PLT lookup to a given entry may start prior to the update of the given entry from the prior lookup. Bypassing of data from the subsequent pipeline stages to the previous pipeline stages when the same entry is read may be used. Alternatively, the pipeline may be stalled in such cases for the subsequent lookup until the previous update completes.

Figure 7:
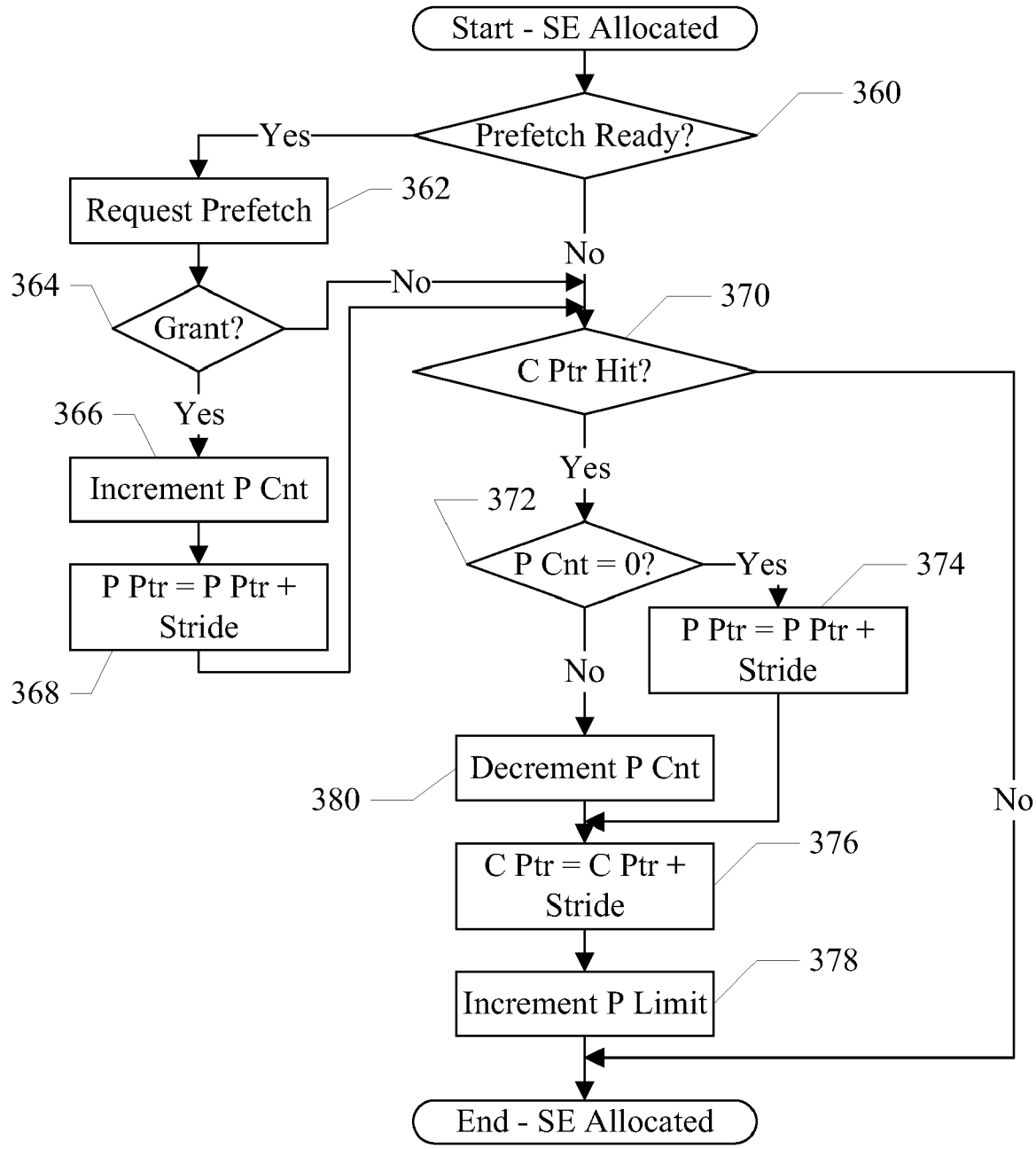
FIG. 7 is a flowchart illustration operation of one embodiment of a stream engine that has been allocated a prefetch stream.

Turning now to FIG. 7, a flowchart is shown illustrating operation of one embodiment of the stream engine 306A (and more particularly the SE control circuit 312 for the embodiment shown in FIG. 3) and the prefetch control circuit 308 in response to the allocation of a prefetch stream to the engine 306A. Other stream engines may be similar. While the blocks are shown in a particular order for ease of understanding, other orders may be used. Blocks may be performed in parallel in combinatorial logic circuitry within the stream engine 306A. Blocks, combinations of blocks, and/or the flowchart as a whole may be pipelined over multiple clock cycles. Thus, the stream engine 306A/SE control circuit 312 and the prefetch control circuit 308 may be configured to implement the operation illustrated in FIG. 7, as discussed below.

The stream engine 306A may determine if a prefetch is ready to issue (decision block 360). In some embodiments, a prefetch may be ready to issue if the number of prefetches outstanding is less than the limit. In one embodiment, the limit may be changed as the number of prefetches that are consumed by demand accesses increases. If demand accesses are consuming the prefetches, the confidence that the prefetch stream is accurate and continuing to be used may increase. Particularly, if the number of consumed prefetches equals the limit, the limit may be increased.

A specific embodiment that increases the limit may initialize the P Limit value to the initial limit for prefetches, and may increment the P Limit as prefetches are consumed. Each time the incremented P Limit value doubles, the limit may be doubled as well. For example, in an embodiment, the initial limit may be 4 prefetches. As prefetches are consumed, the P Limit is incremented. Once 4 prefetches are consumed by demand accesses, the P limit has increased to 8. The new limit of 8 may take effect, and thus the limit has been doubled. Viewed in another way, once the number of prefetches at least equal to the limit has been consumed, the limit is increased. Particularly, the limit may be doubled. There may also be a maximum limit (based on the size of the P Limit value) beyond which the limit may not be increased. That is, the P Limit value may saturate at a maximum value. Other embodiments may increase the limit at different rates and in different ways. For example, an embodiment may initialize the limit at 4 and increase by 4 each time, or increase by two each time, etc.

If a prefetch is ready to issue (decision block 360, "yes" leg), the stream engine 306A may request a prefetch from the prefetch control circuit 308 (block 362). If the prefetch control circuit 308 grants the request (decision block 364, "yes" leg), the stream engine 306A (and more particularly the SE control circuit 312) may issue the prefetch to the address stored as the P Ptr in the registers 314 through the mux 310, and may increment the P CNT to indicate that another prefetch is outstanding (block 366). Additionally, the stream engine 306A may update the P Ptr, adding the stride to generate the next prefetch address (block 368). If the prefetch request is not granted (decision block 364, "no" leg), the prefetch is not issued and thus no stream engine state is updated.

The prefetch control unit 306 may determine whether or not to grant a prefetch request in a variety of fashions. If more than one stream engine requests a prefetch concurrently, the prefetch control unit 306 may arbitrate the requests to select a winner. Any arbitration mechanism may be used (e.g. round robin, least recently selected, etc.). Additionally, in embodiments which filter prefetches through the data cache 250, the prefetch control unit 306 may grant a prefetch when the L/S pipe status indicates that the prefetch may be inserted into the L/S pipe (e.g. that a given pipeline stage at which the insertion occurs is idle).

If a data address is provided from the data cache 250 (whether it is a cache hit or not), the stream engine 306A may compare the C Ptr to the data address (decision block 370). The comparison may be at a cache block granularity, or a finer granularity of the stride is determined at a finer granularity than the cache block. If the C Ptr is hit by the data address (decision block 370, "yes" leg), and the P Cnt is zero (decision block 372, "yes" leg), then a demand access has consumed the prefetch that has not been issued yet. In such a case, the stream engine 306A may update both the P Ptr and the C Ptr by the stride amount (blocks 374 and 376, respectively), and may increment the P Limit (block 378). If the C Ptr is hit by the data address (decision block 370, "yes" leg), and the P Cnt is not zero (decision block 372, "no" leg), then a demand access has consumed a previously issued prefetch. The stream engine 306A may decrement the P Cnt (block 380), since one fewer prefetches are outstanding, and may update the C Ptr with the stride amount (block 376). The P limit may also be incremented since another prefetch has been consumed (block 378).

Figures 8, 9:
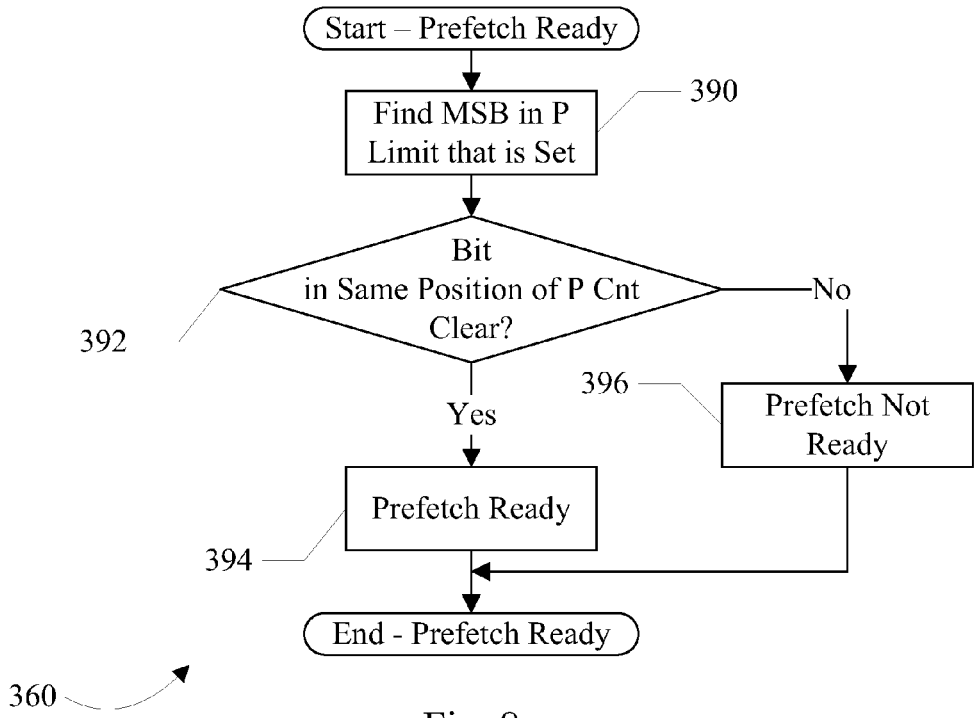
FIG. 8 is a flowchart illustrating one embodiment of determining if a prefetch is ready, as illustrated in FIG. 7.
FIG. 9 is an example of one embodiment of the operation of a stream engine prefetching a stream.

Turning now to FIG. 8, a flowchart is shown illustrating operation of one embodiment of the stream engine 306A (and more particularly the SE control circuit 312) to determine if a prefetch is ready (block 360 in FIG. 7). Other stream engines may be similar. While the blocks are shown in a particular order for ease of understanding, other orders may be used. Blocks may be performed in parallel in combinatorial logic circuitry within the stream engine 306A. Blocks, combinations of blocks, and/or the flowchart as a whole may be pipelined over multiple clock cycles. Thus, the stream engine 306A/SE control circuit 312 may be configured to implement the operation illustrated in FIG. 8.

The stream engine 306A may locate the most significant bit in the P Limit that is set (block 390). The stream engine 306A may test the bit in the same bit location of the P Cnt as the most significant set bit of the P Limit, and it if is clear (decision block 392, "yes" leg), then a prefetch is ready (block 394). If the bit in the same bit location of the P Cnt as the most significant set bit of the P limit is set (decision block 392, "no" leg), then a prefetch is not ready to be issued (block 396).

The above implementation, along with the incrementing of the P limit value for each consumed prefetch, may effectively double the limit each time the number of consumed prefetches equals the limit. For example, if the P limit is initialized to 4, bit 2 of the P limit (numbering the least significant bit zero) is the most significant set bit. As long as the P Cnt is less than 4, the limit has not been reached (and P Cnt bit 2 is zero), so a prefetch may be ready. Additionally, as prefetches are consumed, the P Limit is incremented. After 4 prefetches are consumed, the P Limit reaches 8 and the most significant set bit is bit 3. After 8 more prefetches are consumed, the P limit reaches 16 and the most significant set bit is bit 4. Accordingly, the increments of the P limit may not affect the actual limit until the most significant bit toggles (i.e. at the next power of two).

In some embodiments, other factors may also affect whether or not a prefetch is ready. For example, in one embodiment, a prefetch stream may terminate at a certain address limit. In one implementation, the address limit may be a 2 gigabyte boundary. Other embodiments may implement a larger or smaller address limit.

FIG. 9 is an example illustrating the operation of an embodiment of a stream engine 306A-306N that uses the P Cnt and P Limit definition described with regard to FIG. 8. In FIG. 9, a table of actions is shown, with the order of the actions being the order in the table from top to bottom. The first action is an allocation of a prefetch stream to the stream engine. In the example, the first address is 60 (hexadecimal) and the stride is 20 (hexadecimal). In addition to the action column, the table includes columns for the C Ptr, P Ptr, P Cnt, and P Limit. Each of these columns are in hexadecimal format, and so omits the "0×" notation. In the first row, in response to the allocation, both the P Ptr and the C Ptr are initialized to 60. The P Cnt is 0 (no prefetches are outstanding), and the P Limit is initialized to 4. Other embodiments may use other initial limits, or the limits may be programmable.

The next 4 actions in FIG. 9 are issued prefetches. Accordingly, the P Ptr is updated by the stride amount each time and the P Cnt is incremented. After 4 issued prefetches, bit 2 of both the P Cnt and the P Limit (both 4 at this point in the example) are set, and no additional prefetches are ready. The solid heavy line 400 indicates that the stream engine is idle.

Subsequently, a stream engine hit is detected for a demand access to the data cache 250. The P Cnt is non-zero. Accordingly, the C Ptr is updated by the stride amount (to 80) the P Cnt is decremented to 3, and the P Limit is incremented to 5. Since bit 2 of the P Limit is the most significant set bit, and bit 2 of the P Cnt is 0, a prefetch is ready and is issued as the next action in the example, updating P Ptr to 100 and the P Cnt to 4. At this point, even though the P Cnt is not equal to the P Limit, the most significant set bit of the P Limit is still bit 2 and bit 2 of the P Cnt is set. Effectively, the limit is still 4. Accordingly, the stream engine is again idle (solid heavy line 402).

The next five actions in the example are all stream engine hits. Accordingly, the C Ptr is updated by the stride amount each time, the P Cnt is decremented, and the P Limit is incremented. After a total of 4 stream engine hits (at entry 404), the P Limit has reached 8. The most significant set bit is now bit 3, and thus the limit has increased to 8 prefetches (or doubled). As additional stream buffer hits are detected, the P Limit continues to increment but the limit is still 8 until the most significant set bit changes again (not shown in the example of FIG. 9). At the last entry in the table, a stream buffer hit occurs with the P Cnt=0. Consequently, the next prefetch that would be issued has just been consumed. Accordingly, both the C Ptr and P Ptr are updated by the stride amount (to address 120 in this example).

Exemplary System Embodiment

Figure 10:
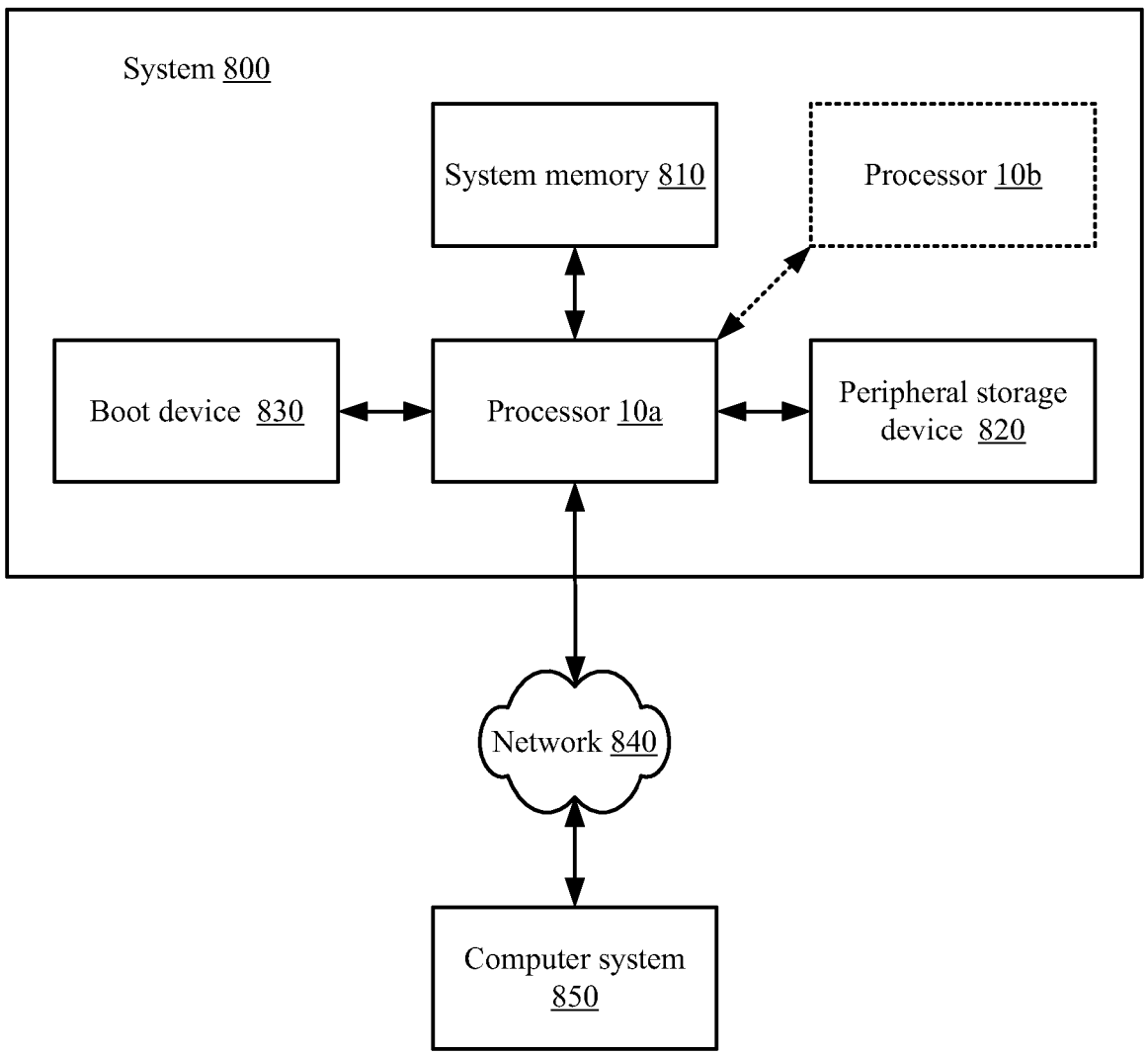
FIG. 10 is a block diagram of one embodiment of a system.

As described above, in some embodiments, processor 10 of FIG. 1 may be configured to interface with a number of external devices. One embodiment of a system including processor 10 is illustrated in FIG. 10. In the illustrated embodiment, system 800 includes an instance of processor 10, shown as processor 10a, that is coupled to a system memory 810, a peripheral storage device 820 and a boot device 830. System 800 is coupled to a network 840, which is in turn coupled to another computer system 850. In some embodiments, system 800 may include more than one instance of the devices shown. In various embodiments, system 800 may be configured as a rack-mountable server system, a standalone system, or in any other suitable form factor. In some embodiments, system 800 may be configured as a client system rather than a server system.

In some embodiments, system 800 may be configured as a multiprocessor system, in which processor 10a may optionally be coupled to one or more other instances of processor 10, shown in FIG. 10 as processor 10b. For example, processors 10a-b may be coupled to communicate via their respective coherent processor interfaces 140.

In various embodiments, system memory 810 may comprise any suitable type of system memory as described above, such as FB-DIMM, DDR/DDR2/DDR3/DDR4 SDRAM, or RDRAM®, for example. System memory 810 may include multiple discrete banks of memory controlled by discrete memory interfaces in embodiments of processor 10 that provide multiple memory interfaces 130. Also, in some embodiments, system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In one embodiment, peripheral storage device 820 may be coupled to processor 10 via peripheral interface(s) 150 of FIG. 1.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc. In some embodiments, processor 10 may be configured to communicate with network 840 via network interface(s) 160 of FIG. 1.

Numerous variations and modifications will become apparent to those skilled in the art once the above disclosure is fully appreciated. It is intended that the following claims be interpreted to embrace all such variations and modifications.

What is claimed is:

1. A prefetch unit comprising:
a memory including a plurality of entries, each entry configured to store data corresponding to a different potential prefetch stream;
a plurality of stream engines, each stream engine configured to generate prefetches for a different prefetch stream assigned to that stream engine; and
a control circuit coupled to the memory and the plurality of stream engines, and in response to a first load operation that misses in a data cache in the processor, the control circuit is configured to: update a corresponding entry of the plurality of entries, detect a prefetch pattern corresponding to the first load operation responsive to data in the corresponding entry, and allocate a first prefetch stream corresponding to the detected prefetch pattern to one of the plurality of stream engines, wherein the control circuit is configured to allocate the first prefetch stream to the one of the plurality of stream engines responsive to detecting the prefetch pattern.

2. The prefetch unit as recited in claim 1 wherein the control circuit is further configured to invalidate the data in the corresponding entry responsive to allocating the first prefetch stream to the one of the plurality of stream engines.

3. The prefetch unit as recited in claim 1 wherein the control circuit is further responsive to the first load operation missing in a miss buffer that stores previously detected cache misses that are to be issued to a memory system.

4. The prefetch unit as recited in claim 1 wherein the plurality of stream engines are coupled to receive a data address that is detected to miss in the data cache for the first load operation, and wherein the stream engines are configured to compare the miss address to prefetch addresses in the stream engines, and wherein the control circuit is further responsive to the miss address missing the prefetch addresses in the stream engines.

5. The prefetch unit as recited in claim 1 wherein the control circuit update to the corresponding entry includes allocating the corresponding entry if the address corresponding to the first load operation is a miss in the memory.

6. The prefetch unit as recited in claim 5 wherein the prefetch unit is configured to detect strided prefetch patterns, and wherein allocating the corresponding entry comprises writing a miss address corresponding to the first load operation to a last miss address field in the corresponding entry and setting a stride field in the corresponding entry to zero.

7. The prefetch unit as recited in claim 6 wherein, in response to a second execution of the first load operation and the detection of a second data cache miss by the first load operation, the control unit is configured to update the last miss address field and to calculate a stride between the previous contents of the last miss address field and a second miss address corresponding to the second execution.

8. The prefetch unit as recited in claim 7 wherein, in response to a third execution of the first load operation and the detection of a third data cache miss by the first load operation, the control unit is configured to confirm the stride and allocate the first stream to the one of the plurality of stream engines.

9. The prefetch unit as recited in claim 1 wherein each entry of the plurality of entries is configured to store a thread identifier (ID) identifying a thread for which the potential prefetch stream is being monitored, and wherein the memory is further coupled to receive a thread ID input, and wherein the thread ID is matched to the corresponding entry to detect a hit.

10. The prefetch unit as recited in claim 1 wherein the memory comprises an address input coupled to receive an address corresponding to a load operation being executed in a processor that includes the prefetch unit, wherein the memory is configured to select one or more of the plurality of entries responsive to at least a portion of the address, wherein the address of the corresponding entry in the memory is derived for a program counter (PC) address of the first load operation.

11. The prefetch unit as recited in claim 10 wherein the address is further derived from a thread identifier corresponding to a thread that includes the first load operation.

12. A processor comprising:
a data cache; and
a prefetch unit coupled to the data cache, wherein the prefetch unit is configured to detect one or more prefetch streams corresponding to load operations that miss the data cache, and wherein the prefetch unit comprises a memory configured to store data corresponding to potential prefetch streams, wherein the prefetch unit is configured to confirm a prefetch stream in response to N or more demand accesses to addresses in the prefetch stream, where N is a positive integer greater than one and is dependent on a prefetch pattern being detected, and wherein the prefetch unit comprises a plurality of stream engines, each stream engine configured to generate prefetches for a different prefetch stream assigned to that stream engine, and wherein the prefetch unit is configured to assign the confirmed prefetch stream to one of the plurality of stream engines in response to confirming the prefetch stream, wherein potential prefetch streams tracked in the memory are not assigned to stream engines until the prefetch stream is confirmed.

13. The processor as recited in claim 12 wherein the plurality of stream engines are coupled to receive a data address that is detected to miss in the data cache for a first load operation, and wherein the stream engines are configured to compare the miss address to prefetch addresses in the stream engines, and wherein the prefetch unit is further responsive to update the memory responsive to the miss address and further responsive to the first load operation missing the prefetch addresses in the stream engines.

14. The processor as recited in claim 12 wherein the prefetch unit is configured to confirm strided prefetch streams, and wherein the prefetch unit is configured to allocate an entry in the memory to store data for a first potential prefetch stream corresponding to a first load operation in response to a first data cache miss during a first execution of the first load operation.

15. The processor as recited in claim 14 wherein, in response to a second execution of the first load operation and the detection of a second data cache miss by the first load operation, the prefetch is configured to calculate a stride for the first potential prefetch stream.

16. The processor as recited in claim 15 wherein, in response to a third execution of the first load operation and the detection of a third data cache miss by the first load operation, the prefetch unit is configured to confirm the stride and allocate the prefetch stream to the one of the plurality of stream engines.

17. The processor as recited in claim 12 wherein the memory is indexed by an address corresponding to a load miss operation, and wherein the address is derived from a program counter address of the load miss operation and a thread identifier that identifies a thread containing the load miss operation.

18. A method comprising:
   a prefetch unit detecting a prefetch pattern responsive to at least N demand accesses in a processor, the prefetch unit comprising a memory in which data corresponding to potential prefetch patterns corresponding to previous data cache misses is stored, wherein N is an integer greater than one;
   the prefetch unit allocating one of a plurality of stream engines to prefetch a prefetch stream based on the detected prefetch pattern, wherein the prefetch unit does not allocate one of the plurality of stream engines until at least N demand accesses have occurred to define the prefetch pattern; and
   the prefetch unit invalidating data corresponding to the detected prefetch pattern in the memory in response to allocating the one of the plurality of stream engines.

19. The method as recited in claim 18 further comprising:
   the one of the plurality of stream engines generating one or more prefetches corresponding to the prefetch stream; and
   a data cache in which the data cache misses were detected storing the data prefetched in response to the generated prefetches.

20. The method as recited in claim 18 further comprising addressing the memory with an address derived from a program counter (PC) address of an instruction corresponding to the demand accesses and further derived from a thread identifier that identifies a thread including the instruction.

* * * * *